United States Patent [19]
Jarrin et al.

[11] Patent Number: 5,307,843
[45] Date of Patent: May 3, 1994

[54] EXTRUSION OF TUBES OF FIBER-REINFORCED THERMOPLASTICS

[75] Inventors: Jacques Jarrin, Rueil Malmaison; Emmanuel Vinciguerra, Nanterre; Gilles Ausias, Antibes; Michel Vincent, Ville Neuve Loubet; Francois Dawans, Bougival, all of France

[73] Assignee: Institut Francais du Petrole, Rueil Malmaison, France

[21] Appl. No.: 847,737

[22] Filed: Mar. 9, 1992

[30] Foreign Application Priority Data

Mar. 7, 1991 [FR] France .................. 91 02894

[51] Int. Cl.$^5$ ............................................ F16L 11/08
[52] U.S. Cl. .................... 138/174; 264/108; 264/209.2; 264/209.8; 425/97; 425/107; 425/380; 425/467; 428/36.9
[58] Field of Search ................ 264/108, 209.2, 209.8; 425/380, 381, 467, 381.2, 97, 107; 428/35.7, 36.9; 138/172, 174

[56] References Cited

U.S. PATENT DOCUMENTS

| | | | |
|---|---|---|---|
| 2,666,947 | 1/1954 | Shaw | 264/209.8 |
| 2,973,783 | 3/1961 | Boe | 264/209.2 |
| 3,423,790 | 1/1969 | Gabbrielli | 425/381 |
| 3,907,484 | 9/1975 | Delorme et al. | 425/467 |
| 4,056,591 | 11/1977 | Goettler et al. | 264/103 |
| 4,057,610 | 11/1977 | Goettler et al. | 425/380 |
| 4,240,782 | 12/1980 | McPhee et al. | 425/467 |
| 4,627,472 | 12/1986 | Goettler et al. | 264/108 |
| 4,686,075 | 8/1987 | Dziewanowski et al. | 425/467 |
| 4,883,622 | 11/1989 | Dealy et al. | 264/108 |

FOREIGN PATENT DOCUMENTS 1599234A 10/1990 U.S.S.R. ............. 425/381.2

OTHER PUBLICATIONS

Soviet Inventions Illustrated, Section Ch, Week 9125, 7 Aoot 1991 Derwent Pub. Ltd., London, GB; Class A, AN 91-183765/25.

*Primary Examiner*—Jeffery Thurlow
*Attorney, Agent, or Firm*—Millen, White, Zelano & Branigan

[57] ABSTRACT

Fibre-reinforced tubes made of a thermoplastics material are manufactured using a method of extruding thermoplastics material in a drawplate with a diverging end zone, the end zone of which has a diverging annular flow space which has a ratio $A_s/A_e$ between the exit area and entry area of at least 1.2, and a ratio between the length 1 of the lower edge of the annular exit space of the diverging zone and the width e of the straight section of said annular space which is less than 5; the extrusion operation being carried out in the presence of a liquid lubricant which is incompatible with said thermoplastics material at extrusion temperatures, said lubricant being present at the level of the external wall and at the level of the internal wall of said flow space. Tubes which are manufactured by way of this method are particularly resistant to a high degree of bursting and have an improved surface quality.

23 Claims, 1 Drawing Sheet

EXTRUSION OF TUBES OF FIBER-REINFORCED THERMOPLASTICS

FIELD OF THE INVENTION

The invention is concerned with the technical domain of tubes made of thermoplastics polymers, reinforced by discontinuous fibres and obtained by extrusion.

The invention relates to a process which enables fibres to be directed perpendicularly to the axis of the tube in the plane of the tube wall and which enables the mechanical properties of tubes thus prepared to be considerably improved. The invention also relates to an apparatus which ca-n be used in a process such as this, and to tubes which are manufactured by implementation of that apparatus.

BACKGROUND OF THE INVENTION

Manufacturers and users of these tubes are constantly concerned with improving the mechanical behaviour of tubes manufactured by the extrusion of plastics material, the main characteristic feature of such tubes being their resistance to bursting and their behaviour to flow with internal pressure.

As a first approximation, the stresses produced in a tube of low thickness in relation to the radius, with an internal pressure P are given by the equations:

$$\sigma_L = \frac{PR}{2e}$$

$$\sigma_R = \frac{PR}{e}$$

with
- $\sigma_L$: stress in the longitudinal extent
- $\sigma_R$: stress in the radial extent
- e: thickness of tube wall
- R: average radius of tube The pull is approximately twice as great in the radial extent as in the longitudinal extent.

For a homogeneous, isotropic substance (that is to say one where the mechanical properties are independent of the direction of pull) in the form of a tube subjected to an internal pressure P, the tube can rupture by swelling and bursting when a crack develops in the longitudinal extent.

Simple methods for extruding short glass fibre-reinforced plastics materials in no way improve the performance of tubes manufactured in that way. Actually, it is a well known fact that the fibres then tend to be directed in the direction of flow, and the reinforcing effect is then particularly sensitive in the longitudinal extent which is that subject to less pull, whilst in the radial extent the mechanical properties of the material are only slightly improved.

The need for the fibres to be directed mainly in the circumferential extent has often led to tube manufacturers using continuous fibres joined to the tube which has been extruded beforehand, using spool techniques, for example. The specification BE-684.102 is known, for example, wherein spool techniques are used to arrange a band of continuous fibres over a tube which has been extruded beforehand, and this band is covered over by a second plastics layer which is deposited by extrusion with a square head. The specification GB-1.052.884 is also known, wherein, still using a tube which has been extruded beforehand, a tubular braid of reinforcing fibres is arranged and covered over by a second plastics layer using an extrusion method with a square head. These techniques which are effective in reinforcing tubes are, however, awkward to carry out because they require two extruders, one of which is provided with a square head, a spool or a braiding machine and devices for holding the supporting internal tube during the braiding or spool operations, which can be quite complicated if proper adherence of the various plastics layers is to be achieved.

The U.S. Pat. No. 3,508,297 is also known, wherein a description is given of the direct passage of a tubular braid in an extrusion drawplate with a square head, and of the encasement of that braid within the plastics layer to form a reinforced tube. The device is delicate to use, mainly because a very special tool is needed to enable these braided tubes to pass through the drawplate whilst ensuring that it is sealed to molten plastics material and under pressure in the drawplate. Moreover, manufacturing devices, feed devices and braided tube support devices are needed upstream of the extruder.

This kind of process always requires extra equipment and expenditure with respect to the treatment of the reinforced continuous fibres and because of the need for the various layers deposited at different stages during the process to adhere together properly.

These problems do not exist if discontinuous fibres are used to reinforce the plastics material.

In fact, the materials reinforced by discontinuous fibres can be extruded without any major problems, and the patent GB-2.182.603 describes, for example, the manufacture of tubes using conventional extrusion methods followed by expansion of the tube by applying an internal pressure which places the tube flat against a conformator. The fact that the tube swells causes significant longitudinal and radial drawn out sections which can encourage orientation of some of the fibres in the circumferential direction, but this is accompanied by non-adhesion at the interface between the fibres and the polymer material at atmospheric pressure.

The U.S. Pat. No. 3,605,189 is also known which employs a conventional tube drawplate, but which is provided with a rotating mandrel.

Shearing in the radial extent is thus superposed over normal shearing in the direction of flow, and tends to direct at least some of the fibres in a circumferential direction which is perpendicular to the flow axis. In this case, the orientation depends mainly on the relative intensity of the shearing. With regard to the rotational speed of the mandrel, the orientation effect decreases when the shearing rate is increased in the longitudinal extent, for example by increasing the flow rate through the drawplate.

The U.S. Pat. No. 4,056,591 is also known wherein at the end of the drawplate a diverging zone is used, characterised by a ratio between the surface areas of the annular exit sections and of the annular entry sections which is greater than 2. In this device, the flowing substance is urged by shearing in the direction of flow along the walls of the drawplate and in the transverse extent in the divergence. If tubes manufactured in this way are studied, fibres will be seen which are directed perpendicularly to the direction of flow in the heart of the wall thickness, but longitudinally in the wall of the tube. The mechanical properties of the tube are inadequate.

An improvement to this process is described in the U.S. Pat. No. 4,883,622, and it consists in physically separating a zone of low thickness in the tube wall where there is a concentration of shearing. An uncharged polymer flows in that zone, whilst, flowing in the central zone is the charged polymer which extends transversely without shearing.

This kind of coextrusion device permits an increase in the number of fibres oriented perpendicularly to the direction of flow, and thus an increase in the resistance of the tube. However, if the resistance is viewed in consideration of the amount of material per unit of thickness, the process becomes less interesting since the uncharged peripheral layers of material play no part in the reinforcement. Moreover, the high cost of coextrusion is also to the detriment of this process.

SUMMARY OF THE INVENTION

A new process has now been discovered for manufacturing tubes by the extrusion of a thermoplastics material charged with fibres, which, since it combines a discerning formulation of the material and a special geometry of the drawplate, is very simple in terms of its operation, and also permits an improvement to be made to the resistance to bursting to which tubes are prone when subjected to internal pressure, by the fibres being oriented in a circumferential direction, perpendicular to the direction of flow.

BRIEF DESCRIPTION OF THE DRAWINGS

The invention thus relates to a process, an apparatus and tubes manufactured by implementation of said process.

These aspects of the invention will be described hereinafter with the aid of the accompanying drawings, wherein.

DESCRIPTION OF THE INVENTION

Generally speaking, the process of the invention can be defined as a process for the manufacture of tubes by the extrusion of a thermoplastics material charged with fibres, consisting of (a) feed of a thermoplastics material charged with fibres to an extruder with a drawplate consisting of a diverging end zone (referred to hereinafter as: "divergence"), provided on a conventional tube drawplate having a substantially non-diverging straight section parallel to the die axis referred to hereinafter as "drawplate support";

(b) heating said charged thermoplastics material at a temperature which is at least equal to the softening temperature of said charged thermoplastics material;

(c) passage of said material through the drawplate to the diverging end zone;

this process being characterised in that said end zone consists of a diverging annular flow space which has an $A_s/A_e$ ratio of at least 1.2 between its exit area $A_s$ and its entry area $A_e$, and a ratio between the length l of the inner edge and the channel width e of the straight section of said annular space which is less than 5, preferably less than 1.5, and in that stage (c) is effected in the presence of at least one liquid lubricant incompatible with said thermoplastics material at temperatures employed during the extrusion operation, said lubricant being present at a level with the outer wall and at a level with the inner wall of said flow space.

According to the invention, the thermoplastics materials under consideration for manufacturing the tubes can consist, for example, of polyethylenes
polypropylenes
polyvinylchloride
polyamides
poly 1,4-butanediolterephthalate
polyethyleneglycolterephthalate
polyvinylidenefluoride
or various rubbers.

The extrusion temperature can be between 160° and 280° C., for example, depending on the thermoplastics material used.

Furthermore, the fibres making up the reinforcing charge of the thermoplastics material can be constituted, for example, of aromatic polyamide fibres such as Kevlar (registered trade mark), glass, carbon, boron or ceramics fibres. Glass fibres are most frequently used. The fibres are generally a maximum of 1 cm in length, and their length/diameter ratio is at least 10. They are incorporated in the thermoplastics material in a proportion of 5 to 40% by weight, most particularly 20 to 30% by weight.

Figure 1A:
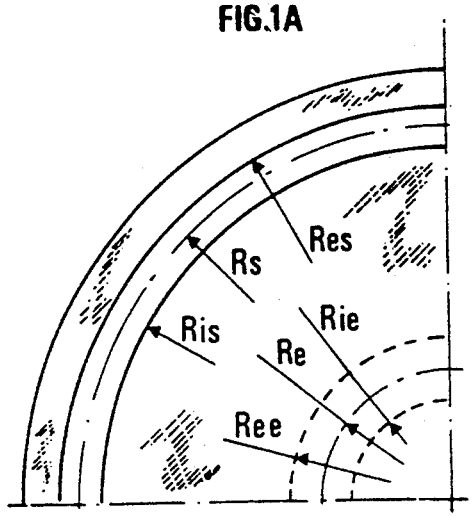
FIG. 1A is a view at the bottom of said zone restricted to a square.
Figure 1:
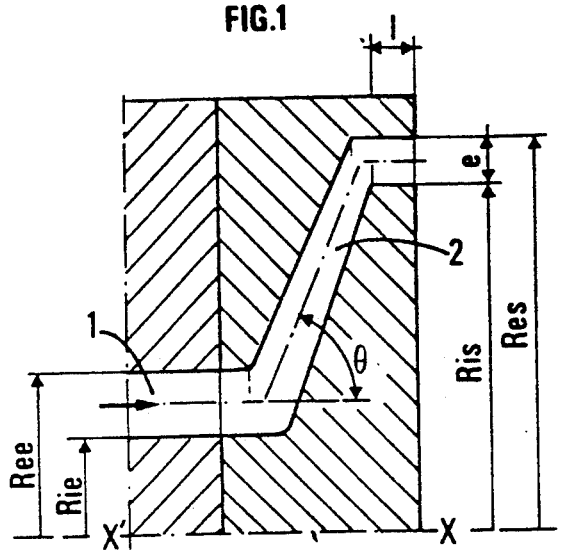
FIG. 1 shows an illustration, in longitudinal section, of the end zone of a drawplate with a divergence; it is used as a reference for the explanation of the various parameters characterising the geometry of said end zone.

If reference is made to FIGS. 1 and 1A, it will be seen that the entry area $A_e$ of the divergence fitted on the drawplate is the area of the annular section which has the internal radius $R_{ie}$ and the external radius $R_{ee}$ is therefore $(R^2_{ee} - R^2_{ie})$. Similarly, the area of the exit $A_s$ of the divergence is the area of the annular section which has the internal radius $R_{is}$ and the external radius $R_{es}$; it is therefore $(R^2_{es} - R^2_{is})$. The ratio $A_s/A_e$ is t least 1.2.

It is also possible to take into consideration the characteristic width of the geometry of the divergence defined by $$\sqrt{\frac{A_s}{A_e} \cdot \frac{R_s}{R_e} \left( \frac{A_s}{A_e} - 1 \right)}$$

wherein $A_s$ and $A_e$ are defined as hereinabove, and $R_s$ and $R_e$ represent the average exit radius and the average entry radius of the divergence respectively. This width is advantageously at least 1.5.

According to a preferred embodiment of the invention, the diverging element fitted on the drawplate of the extruder can have the special features indicated hereinafter, in conjunction with FIGS. 1 and 1A:

The ratio between the internal radius $R_{is}$ of the exit section of the divergence and the external radius $R_{ee}$ of the entry section of said divergence is at least 1.

The angle $\theta$ formed by the direction of the axis of the drawplate with the direction 2 of flow of the material in the diverging zone is at least 60°. This angle can be as much as 90°. In the case of the diverging elements shown in FIGS. 2 and 4, the angle $\theta$ is 90°, and in the case of the diverging element shown in FIGS. 3, the angle $\theta$ is 65°.

Introduced at the interface between the polymer charged with fibres, and the metal wall of the diverging drawplate is a liquid substance of low viscosity which is incompatible with said polymer at the extrusion temperatures of the polymer. The substance which acts as a lubricant can be introduced, for example, in a proportion of between 0.01 and 2.5 cm$^3$ for 100 g of the polymer which is to be extruded.

The liquid lubricating compound is characterised, for example, by a viscosity which is 50 times less than that of the charged polymer and by a solubility parameter which is respectively less $-4$ than the solubility parameter of the polymer, or greater $+4$ than the solubility parameter of the polymer. It can consist, in particular, of a polyethylene glycol which has an average molecular mass of 400 to 10 000.

According to a first variant of the process of the invention, the lubricating compound can be introduced directly with the polymer which may be charged, for example, in the form of a granulated substance, into the feed funnel of the extruder. It is then necessary to ensure that distribution of the granulated substance at the surface is homogeneous in order to prevent the compound from accumulating in certain places on the extruder.

According to a second variant of the invention, a modified apparatus is used which permits the lubricating compound to be introduced at the junction between the drawplate support and the diverging zone. This apparatus forms an object of the invention. It will be described hereinafter in conjunction with the accompanying FIGS. 4 and 4A.

The diverging element used in this apparatus has the geometrical features defined hereinabove in the description of the process of the invention, namely a ratio between the $A_e$ area of the annular entry section of the flow space and the $A_s$ area of the annular exit section of said flow space of at least 1.2, and a ratio between the length 1 of the inner edge and the channel width e of the straight section of said exit zone which is less than 5, preferably less than 1.5.

Moreover, the external wall of the flow space for the thermoplastics material has a bore for the feed of lubricating compound 3, this bore communicating with a distribution channel 4 which has an opening 5 out onto said external wall.

Figure 4A:
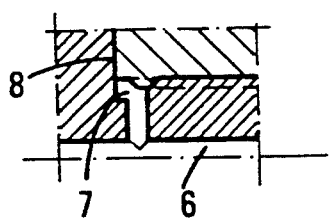
FIG. 4A is an enlarged view of the part A in FIG. 4.

The channel 6 which exists on conventional drawplates and which is used to keep the inside of the extruded tubes at atmospheric pressure is used as the feed bore in the internal wall. As can be seen in FIG. 4A, the channel 6 communicates with the distribution channel 7 which has an opening 8 out over said internal wall. Moreover, the channel 6 opens to the outside through mandrel support vanes. This latter part of the drawplate is not shown in FIG. 4.

To ensure that the assembly of drawplate, divergence is sealed, particularly with a view to preventing lubricant from leaking out of the apparatus, an annular seal 9 is usually provided between the drawplate support and the divergence, at a distance from the axis of the drawplate support which is greater than the distance at which the distribution channel 4 is located.

The lubricant is supplied and flows in a controlled manner by virtue of one or more pumps, preferably at imposed flow (geared pumps).

When the above-described apparatus is used, the polymers must be prevented from rising up in the opening 5 and 8 which supply the walls of the drawplate with lubricant. The thickness of the openings can be controlled by tightening the diverging zone on the drawplate support.

The openings are in the order of about 0.1 mm in thickness, and, when the installation first becomes operative, the diverging zone has to be supplied with lubricant first of all before the charged material to be extruded begins to flow.

The flow of lubricant is then controlled in dependency on the flow rate of the thermoplastics material to be extruded, in such a way that the amount of lubricant introduced is between 0.01 and 2.5 cm$^3$ for 100 g of thermoplastics material to be extruded.

Irrespective of whether the lubricant is incorporated directly into the material to be extruded when it is being introduced into the feed funnel of the extruder, or whether a modified apparatus is used to introduce lubricant into the junction between the drawplate support and the diverging element, the amount of lubricant introduced will advantageously remain relatively low, for example less than 1.5 cm$^3$ for 100 g of thermoplastics material to be extruded. In fact, when the amount of lubricant increases, fluctuations in flow rate can occur because the lubricant and polymer material are non-miscible, and more particularly because of the great difference in viscosity between them; these fluctuations appear as distinct or irregular flow patterns of the lubricant and polymer.

One advantage of the process according to the invention relates to the surface state of the extruded tubes which is surprisingly considerably improved by implementation of the process.

In fact, a polymer which is charged with fibres and which is extruded in the form of a tube usually has a very rugged surface, and the fibres skim the surface in some cases.

Moreover, the techniques such as surfacing of the diverging zone or the surface treatment thereof to improve the sliding capacity of the molten material are only effective for a short period of time because of the abrasive nature of the fibres which impair, or even destroy, the surfaces thus prepared.

The polymer which is charged with fibres and which is extruded under the conditions which characterise the process of the invention has a perfectly smooth surface of the kind obtained by extruding a non-charged polymer.

The introduction of lubricant therefore seems to promote the production of a continuous non-charged polymer layer on the walls of the tubes, which is advantageous in insulating the glass fibres and the glass-polymer interfaces from direct contact with the liquids surrounding the pipe being used, thus of achieving improved durability of the pipe.

The following examples illustrate the invention.

EXAMPLE 1

Figure 2:
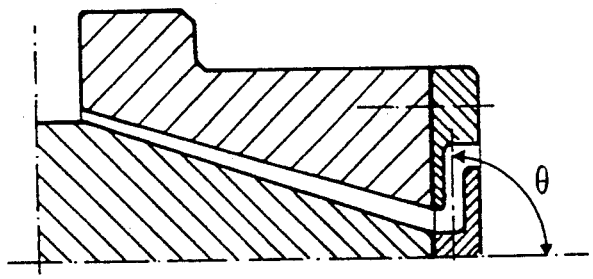
FIG. 2 shows a longitudinal section of the end zone of a drawplate with a divergence, such as that used in Examples 1 and 2 (drawplate no. 1)
Figure 3:
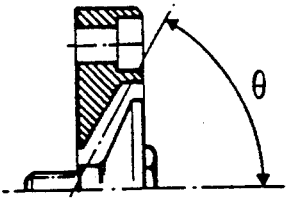
FIG. 3 shows, in section, a diverging element which differs in terms of its geometry from the drawplate in FIG. 2.

In tests 1 and 2, a TROESTER single screw extruder is used which has a screw diameter of 45 mm and a length of 25 D, provided with a tube drawplate to which is fitted a divergence like that shown in FIG. 2, which has the following geometric characteristics:

at the entry $R_{ie}$  0.5 cm  
$R_{ee}$  0.9 cm  $\}A_e = 1.759\ cm^2$ $R_e$ (mean)  0.7 cm at the exit $R_{is}$  2.0 cm  
$R_{es}$  2.2 cm  $\}A_s = 2.638\ cm^2$ $R_s$ (mean)  2.1 cm $\frac{As}{Ae} = 1.499$ $\sqrt{\frac{As}{Ae} + \frac{Rs}{Re}\left(\frac{As}{Ae} - 1\right)} = 1.730$ angle $\theta = 90°$ This drawplate will be designated as diverging drawplate no. 1.

In tests 3 and 4, the same extruder is used, but it is fitted with a conventional tube drawplate.

In test 5, drawplate no. 1 is used with the diverging element removed. The structure of the tube is then kept by means of a pressure which is applied inside the tube which inflates it and places it flat against the walls of the conformator under a vacuum, ensuring that the material is cooled. In tests 1, 3 and 5 a polypropylene charged with 30% by weight discontinuous glass fibres is extruded at 210° C.

This polypropylene has a density of 1.14 and a fluidity index, measured according to the standard ASTM D-1238, of 4 g/10 min under 5 kg. It is sold by the company HOECHST under the reference HOSTALEN PPN 7790 GV 2/30.

In tests 2 and 4, the same polypropylene is extruded in which there is incorporated, in a mixing device with a bore, 0.5 cm³ polyethyleneglycol of mass 6000 and melting temperature 45° C. for 100 g charged polypropylene.

In this table, $\sigma_R$, expressed in MPa is the resistance of the material in the radial extent, calculated on the basis of the bursting pressure measured on the basis of the mean radius $R_s$ and thickness e of the tube on the line of propagation of the break by the equation:

TABLE I $$\sigma_R = \frac{Pc \times Rs}{e}$$

| TEST | 1 | 2 | 3 | 4 | 5 |
|---|---|---|---|---|---|
| Drawplate | No. 1 | No. 1 | Tube Draw plate | Tube Draw plate | Drawplate without divergence & swelling |
| PEG 6000 (%) | 0 | 0.5 | 0 | 0.5 | 0 |
| Extrusion Conditions | | | | | |
| screw speed (revs/min) | 10 | 10 | 10 | 10 | 10 |
| pressure (bars) | 35 | 32 | 23 | 22 | 33 |
| temperature (°C.) | 210 | 210 | 210 | 210 | 210 |
| flow (g/mn) | 109 | 113 | 94 | 94 | 98 |
| drawing speed (cm/s) | 0.47 | 0.50 | 0.48 | 0.50 | 0.47 |
| Tube Features | | | | | |
| thickness (mm) | 2.0 | 1.7 | 2.5 | 2.6 | 2.3 |
| bursting pressure (bars) | 62 | 55 | 25 | 48 | 20 |
| $\sigma_R$ (MPa) | 62 | 64.7 | 20 | 36.9 | 23 |

TABLE I-continued $$\sigma_R = \frac{Pc \times Rs}{e}$$

| TEST | 1 | 2 | 3 | 4 | 5 |
|---|---|---|---|---|---|
| surface appearance | bad | good | bad | good | bad |

In order to make a comparison, the resistance to traction was also determined of samples which had been drawn out longitudinally for the test tube 3, for which the fibres are oriented in the longitudinal extent. The resistance to traction was 70 MPa. That value is the maximum attainable by this material.

In view of Table 1, it seems clear that the association of a diverging drawplate and use of a lubricant which is incompatible with the charged polymer (test 2) makes it possible for a circumferential stress value to be obtained which is very close to this maximum value. A pleasing appearance is also noted of the tube surface.

EXAMPLE 2

In this example, by using an extruder fitted with a drawplate with divergence no. 1, already described in Example 1, the same fibre glass charged polypropylene as before is extruded, but various proportions of polyethyleneglycol 6000 have been incorporated therein beforehand.

The conditions and results of the various tests are shown in Table 2, wherein Tests 1 and 2 in Example 1 are recalled.

The results given in Table 2 show that when the content of lubricant is relatively high (2 cm³/100 g), the mechanical properties of the tube are not as good, as a result of flow problems.

TABLE 2

| TEST | 1 | 2 | 6 | 8 |
|---|---|---|---|---|
| Drawplate | No. 1 | No. 1 | No. 1 | No. 1 |
| PEG 6000 (cm³/100 g) | 0 | 0.5 | 1 | 2 |
| Extrusion Conditions | | | | |
| screw speed (revs/min) | 10 | 10 | 10 | 10 |
| pressure (bars) | 35 | 32 | 28 | 24 |
| temperature (°C.) | 210 | 210 | 210 | 210 |
| flow (g/mn) | 109 | 113 | 77 | 84 |
| drawing speed (cm/s) | 0.47 | 0.50 | 0.52 | 0.52 |
| Tube Features | | | | |
| thickness (mm) | 2.0 | 1.7 | 1.7 | 1.8 |
| bursting pressure (bars) | 62 | 55 | 46 | 39 |
| $\sigma_R$ (MPa) | 62 | 64.7 | 54.1 | 41.1 |
| circumferential appearance of surfaces | bad | good | good | bad |

EXAMPLE 3

Figure 4:
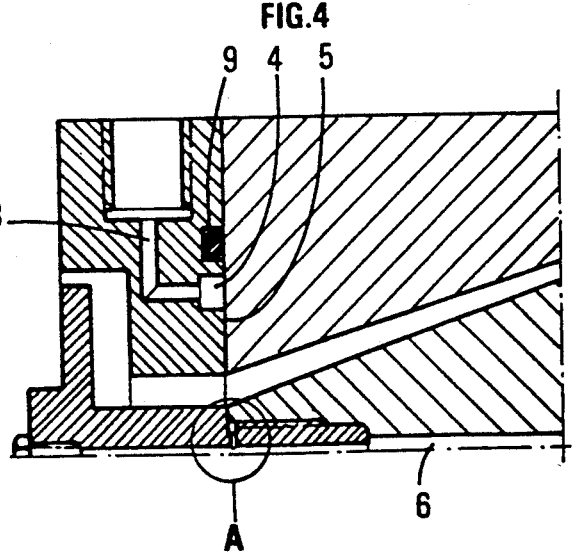
FIG. 4 shows a longitudinal section of a drawplate with a modified divergence according to the invention, as used in Example 3 (drawplate no. 2).

In this example, the extruder is provided with a modified diverging drawplate, such as shown in FIGS. 4 and 4A (drawplate no. 2). Its geometric features are as follows:

at the entry $R_{ie}$  0.5 cm  
$R_{ee}$  0.9 cm  $\}A_e = 1.759\ cm^2$ $R_e$ mean  0.7 cm at the exit $R_{is}$  1.8 cm  
$R_{es}$  2.2 cm  $\}A_e = 5.026\ cm^2$ -continued $R_s$ mean      2.0 cm $A_s = 2,857$ $$\sqrt{\frac{As}{Ae} + \frac{Rs}{Re}\left(\frac{As}{Ae} - 1\right)} = 2,857$$

Angle $\theta = 90°$

The material to be extruded is the same glass fibre charged polypropylene as in Examples 1 and 2. Its flow rate in the drawplate can be controlled by the rotational speed of the extruder screw.

The diverging drawplate is supplied with lubricant (polyethylene glycol of mean molecular mass 400) by way of a geared FEINPRUF (registered trade mark) pump, which, depending on the tests, ensures flow rates of between 0.1 and 2.5 cm³ for 100 g polymer. Test 9 is carried out without lubricant.

TABLE 3

| TEST | 9 | 10 | 11 | 12 | 13 | 14 | 15 | 16 | 17 |
|---|---|---|---|---|---|---|---|---|---|
| Extrusion conditions | | | | | | | | | |
| screw speed (revs/mn) | 10 | 10 | 10 | 10 | 10 | 10 | 20 | 40 | 50 |
| pressure (bars) | 31 | 30 | 29 | 30 | 28 | 31 | 29 | 42 | 49 |
| temperature (°C.) | 200 | 200 | 200 | 200 | 200 | 200 | 200 | 200 | 200 |
| polymer flow rate (g/mn) | 95 | 105.5 | 110.5 | 108.5 | 109 | 111.3 | 211.5 | 295 | 343 |
| lubricant flow rate (cm³/mn) | 0 | 0.1 | 1 | 1.5 | 2 | 2.5 | 2.5 | 2.5 | 2.5 |
| relative flow rate (cm³/100 g) | 0 | 0.10 | 0.90 | 1.38 | 1.83 | 2.25 | 1.18 | 0.85 | 0.73 |
| drawing rate (cm/s) | 0.7 | 0.5 | 0.5 | 0.5 | 0.5 | 0.5 | 0.93 | 1.40 | 1.75 |
| Tube Features | | | | | | | | | |
| thickness (mm) | 1.6 | 2.3 | 2.1 | 2.4 | 2.6 | 2.6 | 2.5 | 2.3 | 2.4 |
| bursting pressure (bars) | 30 | 61 | 55 | 54 | 55 | 49 | 54 | 52 | 48 |
| $\sigma_R$ | 37.5 | 53 | 52.4 | 45 | 42.3 | 37.7 | 43.2 | 45.2 | 40 |

The extrusion conditions and characteristic features of the tubes obtained are indicated in Table 3 above.

Table 3 shows good mechanical properties for tests 10 to 12. The mechanical properties deteriorate as the lubricant flow rate increases from 2 cm³/mn, for a polymer flow rate which is practically constant (in the order of 110 g/mn), in tests 13 and 14. This deterioration in the mechanical properties is due to fluctuations in the respective flow rates of the polymer and lubricant. The problems are overcome by reducing the relative flow rate of lubricant in relation to the polymer, for example by increasing the flow rate of the polymer in tests 15 to 17, wherein the circumferential stress again attains satisfactory values.

We claim:

1. In a process for the manufacture of tubes by extrusion of a thermoplastic material charged with discontinuous fibers through a drawplate comprising an annular diverging end section having an exit zone and entry zone and a substantially non-diverging annular straight section contiguous with the exit zone of the diverging end zone, thereby forming an annular flow space, said straight section having a channel width e and length 1, the improvement wherein said diverging end section has an annular area of its exit zone, $A_s$, of at least 1.2 times the size of the annular area of its entry zone, $A_e$, and a ratio between the length 1 of the inner edge of the annular straight section and the channel width e of the annular straight section of less than 5, wherein the extrusion of said thermoplastic material through said drawplate is effected in the presence of at least one lubricant consisting essentially of a liquid substance of low viscosity and incompatible with said thermoplastic material at temperatures employed during the extrusion operation, said lubricant being present at the surface of the outer wall and at the surface of the inner wall of said flow space and, wherein the angle $\theta$ formed by the axis of the flow path of the straight section with the axis of the flow path of the diverging end section is 60° to 90°.

2. A process according to claim 1, wherein said thermoplastic material is selected from the group consisting of polyethylenes, polypropylenes, polyvinylchloride, polyamides, poly-1,4-butanediol terephthalate, polyethyleneglycol terephthalate, polyvinylidenefluoride and rubbers.

3. A process according to claim 1, wherein the fibers are selected from the group consisting of aromatic polyamide, carbon, boron and ceramic glass fibers which are 1 cm in length and wherein the length/diameter ratio is at least 10, the fibers being incorporated into said thermoplastic material in a proportion of 5% to 40% by weight.

4. A process according to claim 1, wherein the ratio between the internal radius $R_{is}$ of the exit zone and the external radius $R_{ee}$ of the entry zone of said diverging zone is at least 1.

5. A process according to claim 1, wherein the ratio between the length 1 of the inner edge of the straight action and the channel width e of the straight section is less than 1.5.

6. A process according to claim 1 wherein said liquid substance is used in a proportion of 0.01 to 2.5 cm³ for 100 g of said thermoplastic material.

7. A process according to claim 6, wherein said proportion does not exceed 1.5 cm³ for 100 g.

8. A process according to claim 1 wherein said liquid substance consists of a polyethyleneglyol with an average molecular mass of 400 to 10,000.

9. A process according to claim 1 wherein said lubricant is introduced in mixture with the thermoplastic material to be extruded during supply to the extruder.

10. A process according to claim 1 wherein at the junction between the straight section and the diverging end zone, said lubricant is directed firstly towards the external wall of the flow space for the thermoplastic material through a bore 3 which communicates with a distribution channel 4 which has an opening 5 out onto said external wall, and is directed secondly towards the internal wall of said flow space for the thermoplastic material via the axial channel 6 provided for the other purpose of keeping the insides of the extruded tubes at atmospheric pressure, said channel 6 communicating with a distribution channel 7 which has an opening 8 which opens out onto said internal wall.

11. Apparatus comprising a drawplate, having a diverging element and a straight section contiguous therewith creating an annular flow space having an internal and external wall, which can be fitted on an extruder drawplate, said diverging element comprising a diverging flow space, with an annular entry zone which has an area $A_e$, and an annular exit zone which has an area $A_s$, wherein the ratio of the surface areas $A_s/A_e$ is at least 1.2, the ratio between the length 1 of the inner edge of the straight section and the channel width e of the straight section is less than 5, and, for the purpose of directing a lubricant towards the external wall of said flow space, said drawplate has a bore 3 communicating with a distribution channel 4 which has an opening 5 which opens out onto said external wall, and, for the purpose of directing said lubricant towards the internal wall of said flow space, has an axial channel 6 communicating with a distributing channel 7 which has an opening 8 out over said internal wall and wherein the angle $\theta$ formed by the axis of the flow path of the straight section with the axis of the flow path of the diverging end section is 60° to 90°.

12. An apparatus according to claim 11, wherein the ratio between the length 1 of the inner edge of the straight section and the channel width e of the straight section is less than 1.5.

13. An apparatus according to claim 11, characterised in that said openings 5 and 8 are arranged at the surface of said diverging element in contact with the external surface of the drawplate.

14. An apparatus according to claim 11, further comprising a drawplate on which is fitted said diverting element.

15. An extruder apparatus comprising a drawplate according to claim 14.

16. Extruded tubes made having improved resistance to bursting of a thermoplastic material charged with discontinuous fibers having a mainly circumferential orientation through the entire thickness of the tube produced according to claim 1.

17. A process according to claim 2, wherein the fibers are selected from the group consisting of aromatic polyamide, carbon, boron and ceramic glass fibers which are 1 cm in length and wherein the length/diameter ratio is at least 10, the fibers being incorporated into said thermoplastic material in a proportion of 5% to 40 % by weight.

18. A process according to claim 17, wherein said liquid substance consists of a polyethyleneglycol with an average molecular weight of 400 to 10,000.

19. An apparatus according to claim 12, wherein the ratio between the length 1 of the inner edge of the straight section and the channel width e of the straight section is less than 1.5.

20. In a process for the manufacturing of tubes be extrusion of a thermoplastic material charged with discontinuous fibers through a drawplate comprising an annular diverging end section and a substantially non-diverging straight section contiguous with the exit zone of the diverging end section forming an annular flow space, the improvement wherein at least one lubricant, consisting essentially of a liquid substance of low viscosity and incompatible with said thermoplastic material at temperatures employed during the extrusion operation, is introduced in the drawplate at the interface between the thermoplastic material and the surface of the outer wall of said flowspace and introduced in the drawplate at the interface between the thermoplastic material and the surface of the inner wall of said flow space.

21. The process of claim 20, wherein the lubricant is used in a proportion of from 0.01 to 2.5 cm$^3$ per 100 g of thermoplastic.

22. The process of claim 20, wherein the lubricant is a polyethyleneglycol with an average molecular mass of 400 to 10,000.

23. Apparatus comprising a drawplate, having a diverging element and a straight section contiguous therewith creating an annular flow space having an internal and external wall, which can be fitted on an extruder drawplate wherein for the purpose of directing a lubricant towards the external wall of said flow space, said drawplate has at the junction of the drawplate and extruder drawplate, a bore 3 communicating with a distribution channel 4 which has an opening 5 which opens out onto said external wall, and, for the purpose of directing said lubricant towards the internal wall of said flow space, has at the junction of the drawplate and extruder drawplate, an axial channel 6 communicating with distributing channel 7 which has an opening 8 out over said internal wall.

* * * * *